June 28, 1927.

L. R. FULTON

AUTO LOCK

Filed Feb. 4, 1924

1,634,099

Inventor
L. R. Fulton
by Hazard and Miller
Att'ys

Patented June 28, 1927.

1,634,099

UNITED STATES PATENT OFFICE.

LOYD R. FULTON, OF LOS ANGELES, CALIFORNIA.

AUTO LOCK.

Application filed February 4, 1924. Serial No. 690,509.

My invention relates to automobile locks and consists of the novel features herein shown, described and claimed.

An object of my invention is to make a lock which may be readily applied to a steering post and steering wheel to lock the steering wheel and hold it from rotation.

Other objects and advantages will appear from the drawings and specification. The drawings illustrate the invention.

Figure 1:
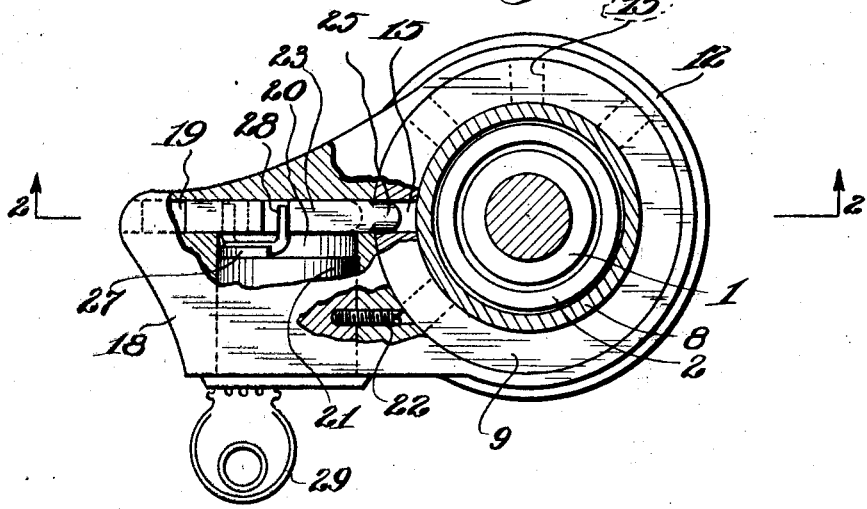
Fig. 1 is a horizontal sectional detail on the line 1—1 of Fig. 2 and looking downwardly as indicated by the arrows.
Figure 2:
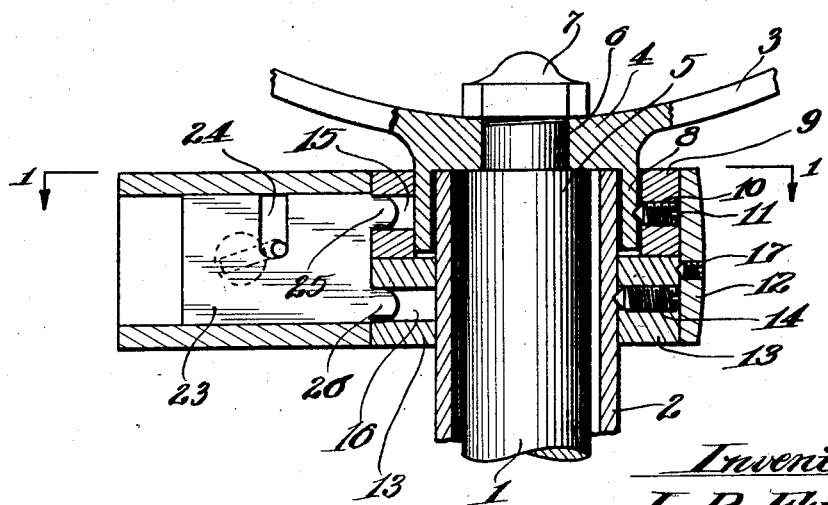
Fig. 2 is a vertical sectional detail on the line 2—2 of Fig. 1 and looking in the direction indicated by the arrows.

The details of the automobile lock shown in Figs. 1 and 2 are as follows:

The steering wheel shaft 1 is rotatably mounted in a tubular steering post 2 and the steering wheel 3 has a hub 4 fitting against the shoulder 5 on the upper end of the shaft 1 and held rigid relative to the shaft by a pintle 6 extending through the hub 4, and a nut 7 screwed upon the pintle and jammed against the hub.

A flange 8 extends from the hub 4 loosely around the upper end of the steering post 2. In applying the lock the nut 7 is removed and the steering wheel is removed and a locking ring 9 is fitted upon the flange 8 and held rigidly in place by one or more set screws 10 inserted through the ring and indented into the flange 8. The set screws 10 are straight screws with kerfs 11 so that the screws may be completely imbedded in the ring.

The housing ring 12 is passed downwardly around the steering post 2 and the ring 13 is fitted upon the steering post 2 and held by one or more kerfed set screws 14. The ring 9 has a locking bolt hole 15 and the second locking ring 13 has a similar locking bolt hole 16. After the rings 9 and 13 have been properly set the ring 12 is moved upwardly to fit around the rings 9 and 13 and is held in place by one or more kerfed set screws 17 engaging the ring 13 so that the ring 9 may rotate with the steering wheel while the ring 13 and the ring 12 remain rigid upon the steering post 2.

If preferred, the set screw 17 might engage the ring 9 instead of the ring 13, the only essential being that the ring 9 is rigid with the steering wheel and the ring 13 is rigid with the steering post and the ring 12 may be carried by either the ring 9 or the ring 13.

The lock case 18 is formed integral with the ring 12 and has a sliding bolt chamber 19 and a lock cylinder chamber 20. The lock cylinder 21 is mounted in the chamber 20 and secured in place by a screw 22 inserted from the inner face of the ring 12. The locking bolt 23 is slidingly mounted in the chamber 19 and has a recess 24 formed from the upper edge and locking heads 25 and 26 adapted to enter the holes 15 and 16.

The key operated cylinder 27 of the lock carries a finger 28 which extends into the recess 24 so that when the key 29 is operated the finger 28 will move the locking bolt 23 to move the heads 25 and 26 into or out of the bolt holes 15 and 16.

When the locking heads 25 and 26 are in the holes 15 and 16 the ring 9 is locked to the ring 13 so that the steering wheel 3 cannot be operated and as soon as the locking bolt 23 is moved outwardly to move the heads 25 and 26 out of the holes 15 and 16 the steering wheel may be freely rotated.

Thus I have produced an automobile lock comprising a locking ring adapted to be rigidly fastened to a steering wheel hub, a second locking ring adapted to be rigidly fastened to a steering post against the first ring, a housing ring encircling the two locking rings and attached to one of the locking rings, a lock casing carried by the housing ring, a locking bolt carried by the lock casing and having two locking heads, the locking rings having holes to receive the heads, and a cylinder lock in the casing for operating the locking bolt, so that when the locking heads are extended the two locking rings are locked together, thereby locking the steering wheel to the steering post.

The locking ring to which the housing is not attached may have a series of the locking bolt holes, so that the steering wheel may be turned to any desired position and locked.

Various changes can be made without departing from the spirit of my invention.

I claim:

1. An automobile lock comprising a locking ring adapted to be rigidly fastened to a steering wheel hub, a second locking ring adapted to be rigidly fastened to a steering post against the first ring, a housing ring encircling the two locking rings and attached to one of the locking rings, a lock casing carried by the housing ring, a locking bolt carried by the lock casing and having two locking heads, the locking rings having holes to receive the heads, and a cylinder lock in the casing for operating the locking bolt, so that when the locking heads are extended the two locking rings are locked together, thereby locking the steering wheel to the steering post.

2. An automobile lock comprising a locking ring adapted to be rigidly fastened to the hub of a steering wheel, a second locking ring adapted to be rigidly fastened to a steering post against the first ring, a housing ring encircling the two locking rings and attached to one of the locking rings, a lock casing carried by the housing ring, a locking bolt carried by the lock casing and having two locking heads, the locking rings having holes to receive the heads, and a lock controlling the operation of the locking bolt.

In testimony whereof I have signed my name to this specification.

LOYD R. FULTON.